United States Patent
Chan et al.

(10) Patent No.: US 10,996,426 B2
(45) Date of Patent: May 4, 2021

(54) 3D IMAGING USING PHASE DETECTION AUTOFOCUS (PDAF) IMAGE SENSOR

(71) Applicant: OmniVision Technologies, Inc., Santa Clara, CA (US)

(72) Inventors: Anson Chan, San Jose, CA (US); Lequn Liu, San Jose, CA (US); Suganda Jutamulia, Berkeley, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 26 days.

(21) Appl. No.: 16/546,358

(22) Filed: Aug. 21, 2019

(65) Prior Publication Data
US 2021/0055502 A1    Feb. 25, 2021

(51) Int. Cl.
*G02B 7/09* (2021.01)
*G06T 5/00* (2006.01)

(52) U.S. Cl.
CPC .............. *G02B 7/09* (2013.01); *G06T 5/003* (2013.01); *G06T 2200/04* (2013.01); *G06T 2207/10028* (2013.01)

(58) Field of Classification Search
USPC .......................................................... 396/79
See application file for complete search history.

(56) References Cited

U.S. PATENT DOCUMENTS

| | | | |
|---|---|---|---|
| 9,420,164 B1 * | 8/2016 | Galor Gluskin | G02B 7/09 |
| 10,440,301 B2 * | 10/2019 | Li | G02B 7/09 |
| 10,715,718 B2 * | 7/2020 | Liu | H04N 5/232122 |
| 2016/0094822 A1 * | 3/2016 | Imade | H04N 9/04557 348/336 |
| 2016/0225805 A1 * | 8/2016 | Keelan | H04N 5/359 |
| 2017/0374306 A1 * | 12/2017 | Vaartstra | H04N 5/2258 |
| 2019/0289218 A1 * | 9/2019 | Liu | G01B 11/24 |
| 2019/0362470 A1 * | 11/2019 | Egiazarian | G06T 5/50 |
| 2020/0285883 A1 * | 9/2020 | Hiasa | G06K 9/6257 |
| 2020/0311981 A1 * | 10/2020 | Hiasa | H04N 5/2355 |
| 2020/0314362 A1 * | 10/2020 | Roh | H04N 5/37457 |

* cited by examiner

Primary Examiner — Rodney E Fuller

(57) ABSTRACT

A 3D imaging system comprises a phase detection autofocus (PDAF) image sensor, a lens for imaging a cross-section of a 3D object on the PDAF image sensor and an actuator for driving the lens for focusing each cross-section of the 3D object on the PDAF image sensor. The actuator drives the lens until the PDAF image sensor identifies an image of a first cross-section of the 3D object in-focus and records the image of the first cross-section. The PDAF image sensor records images of subsequent cross-sections of the 3D object formed by the lens driven by the actuator on the PDAF image sensor. The recorded images of each cross-section of the 3D object are stacked to form a 3D image of the 3D object.

18 Claims, 11 Drawing Sheets

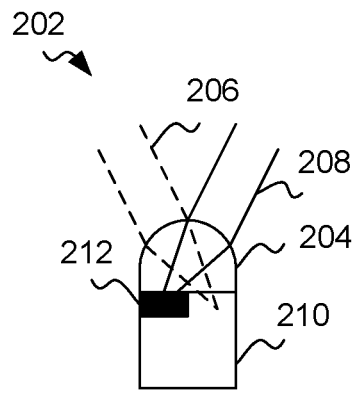
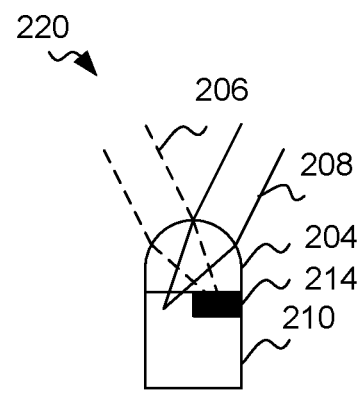
Fig. 2A  Fig. 2B
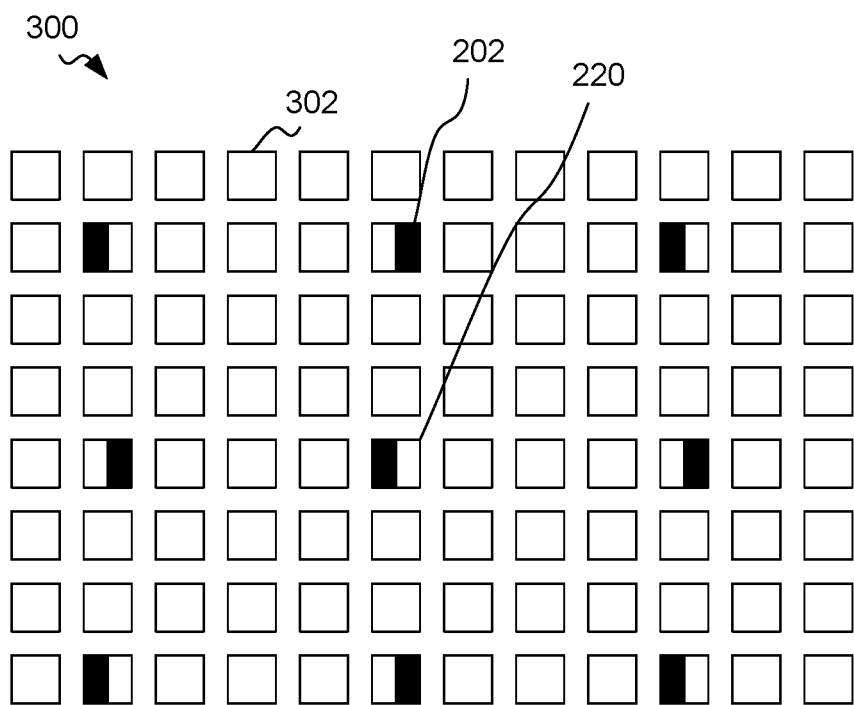
Fig. 3 us
3D IMAGING USING PHASE DETECTION AUTOFOCUS (PDAF) IMAGE SENSOR

FIELD OF THE INVENTION

This invention relates to 3D imaging, and more specifically relates to 3D imaging using phase detection autofocus (PDAF) image sensor.

BACKGROUND OF THE INVENTION

There are many solutions for capturing 3D images including stereo camera, time-of-flight, and structure light. In the solution using structure light, the structure light emitted by vertical cavity surface emitting lasers (VCSELs) is projected on a target surface. In the solution using time-of-flight, a laser pulse is projected on the target surface. If the target is a human face, the projected laser light may cause injury to the human face. 3D imaging of human face recently is used for unlocking a smart phone.

The stereo camera solution needs a sufficient parallax, which in turn needs a relatively large base line between two cameras. The time-of-flight solution needs an advanced electronic processor to determine the extremely short time difference between the light firing time and the reflected light receiving time. The structure light solution needs a more complex optical system for projecting the structure light, thus it may be relatively large for being use in smart phones.

Accordingly, new solutions for capturing 3D images, especially for being used in smart phones, are demanded. The new solutions may not change the size of the device such as a smart phone, and ideally may not add extra hardware elements to complicate the device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 2A-2B illustrate a right-image pixel of a PDAF CMOS image sensor for forming right image and a left-image pixel of a PDAF CMOS image sensor for forming left image, respectively, according to an embodiment of the invention.

FIG. 3 illustrates pixels of a PDAF CMOS image sensor, according to an embodiment of the invention.

Figure 1A:
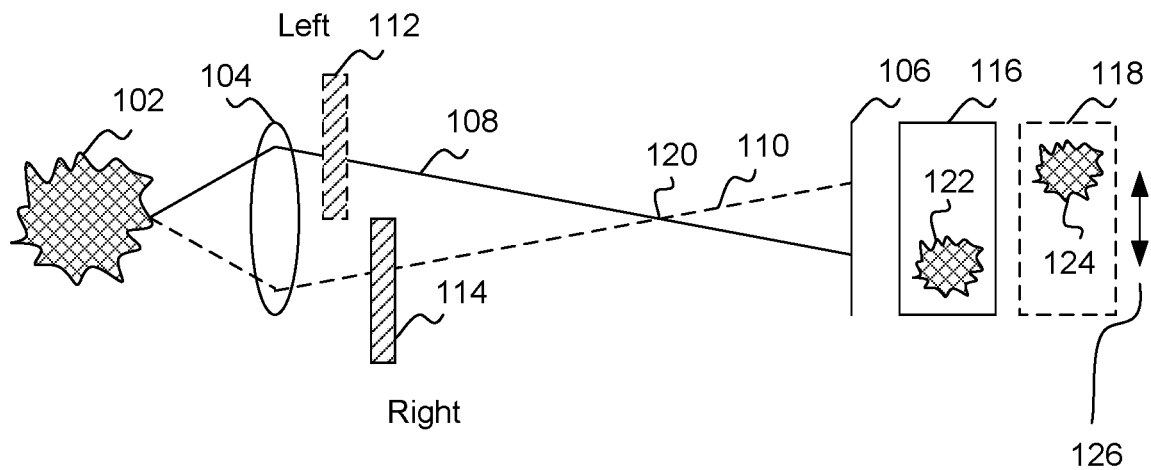
FIGS. 1A-1C illustrate the principle of PDAF, according to an embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

A digital camera may include a lens and an image sensor. The lens formed the image of an object on the image sensor. The digital camera may be a camera installed in a smart phone, or may be a digital SLR (single lens reflex) camera. Recently, a phase detection autofocus (PDAF) image sensor is used in the camera. Together with a lens driven by an actuator, the PDAF image sensor may perform autofocusing. The inherent functions of the PDAF image sensor may be used for 3D imaging. In this manner, no extra hardware elements are required for performing 3D imaging.

Figure 1B:
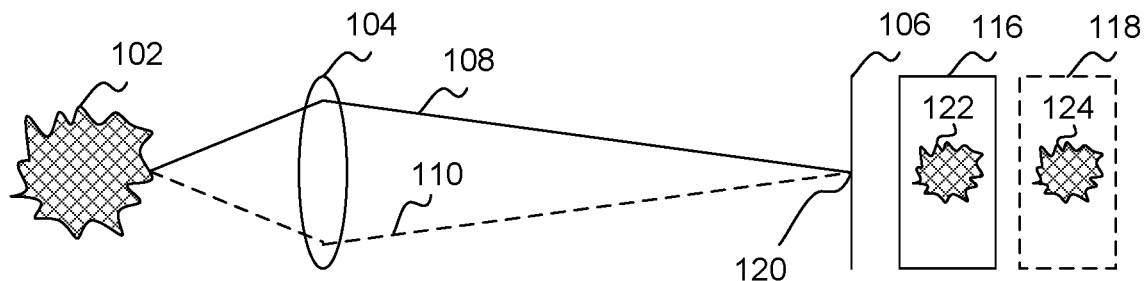
Figure 1C:
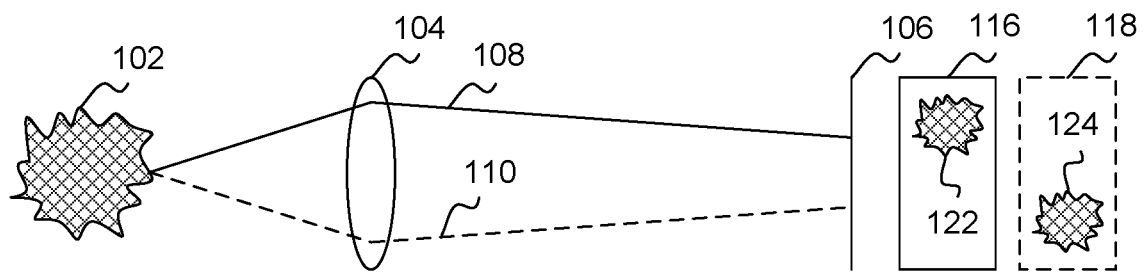

FIGS. 1A-1C illustrate the principle of PDAF, according to an embodiment of the invention. Notice that all drawings are not to scale. A lens 104 images an object 102 on a plane 106. Light 108 passes a half of lens 104. For example, light 108 passes the left half of lens 104. Light 110 passes the right half of lens 104. FIG. 1A shows that if a left mask 112 is placed to block light 108, only light 110 will form an image on plane 106. A right image 118 will be formed on plane 106. If a right mask 114 is placed to block light 110, only light 108 will form an image on plane 106. A left image 116 will be formed on plane 106.

FIG. 1A shows lens 104 at an out-of-focus position. Focus 120 is at the front of plane 106. On plane 106, a first image 122 in left image 116 formed by left light 108 is shifted in horizontal direction 126 from a second image 124 in right image 118 formed by right light 110.

FIG. 1B shows lens 104 at an in-focus position. Focus 120 is at plane 106. On plane 106, first image 122 in left image 116 formed by left light 108 overlaps with second image 124 in right image 118 formed by right light 110.

FIG. 1C shows lens 104 at an out-of-focus position. Focus 120 is at the back of plane 106 (not shown). On plane 106, first image 122 in left image 116 formed by left light 108 is shifted in horizontal direction 126 in reversed direction from second image 124 in right image 118 formed by right light 110.

A CMOS (Complementary Metal Oxide Semiconductor) image sensor comprises a plurality of pixels that detect the intensity value of the incident light. Each pixel comprises a microlens on the top of a photodetector. A PDAF CMOS image sensor includes PDAF pixels. The PDAF pixels are used to perform PDAF. FIG. 2A illustrates a right-image pixel 202 of a PDAF CMOS image sensor for forming right image, according to an embodiment of the invention. FIG. 2B illustrates a left-image pixel 220 of a PDAF CMOS image sensor for forming left image, according to an embodiment of the invention. Left-image pixel and right-image pixel are PDAF pixels. A microlens 204 focuses incident light to a photodiode 210. The incident light comprises right light 206 and left light 208. Right light 206 are from right light 110 of FIGS. 1A-1C. Left light 208 are from left light 108 of FIG. 1A-1C.

In FIG. 2A, left light 208 is blocked by a left mask 212. Left mask 212 covers left half of photodiode 210. Collectively, left masks 212 function as left mask 112 of FIG. 1A. A number of right-image pixels 202 will sample and form a right image such as right image 118 of FIGS. 1A-1C. Similarly, in FIG. 2B, right light 206 is blocked by a right mask 214. Right mask 214 covers right half of photodiode 210. Collectively, right masks 214 function as right mask 114 of FIG. 1A. A number of left-image pixels 220 will sample and form a left image such as left image 116 of FIGS. 1A-1C.

FIG. 3 illustrates pixels 300 of a PDAF CMOS image sensor, according to an embodiment of the invention. Pixels 300 comprise regular pixels 302, a plurality of right-image pixels 202, and a plurality of left-image pixels 220. The plurality of right-image pixels sample and form a right image such as right image 118 of FIGS. 1A-1C. The plurality of left-image pixels sample and form a left image such as left image 116 of FIGS. 1A-1C. The sampled and formed right and left images are used for the PDAF process. Lens 104 of FIGS. 1A-1C is moved by an actuator (not shown) until the position as shown in FIG. 1B is achieved, in which the detected image by the image sensor is in-focus.

In the detected image by the image sensor, the intensity values at the positions of right-image pixels 202 and left-image pixels 220 are obtained by interpolation of neighboring regular pixels. A regular pixel receives both right light 206 and left light 208 of FIGS. 2A-2B. A PDAF pixel such as right-image pixel 202 or left-image pixel 220 receives only part of the incident light, thus its value cannot be included in the detected image. To maintain the quality of the detected image, the number of left-image and right-image pixels is limited. For example, the number of left-image and right-image pixels is limited to 5% of the total number of pixels 300 of the image sensor.

Figure 4A:
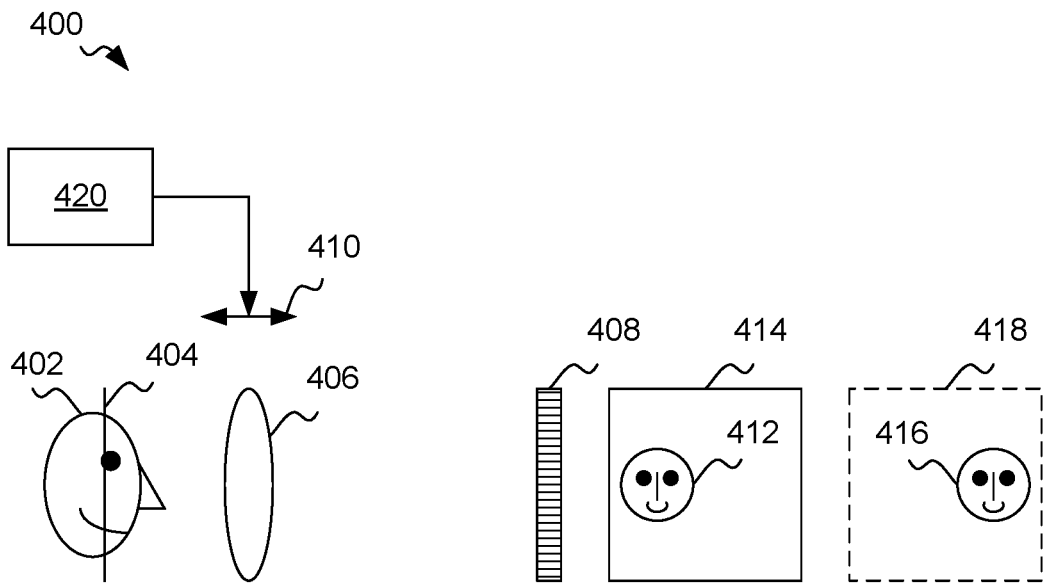
FIGS. 4A-4B illustrate a system for 3D imaging using a PDAF image sensor, according to an embodiment of the invention.
Figure 4B:
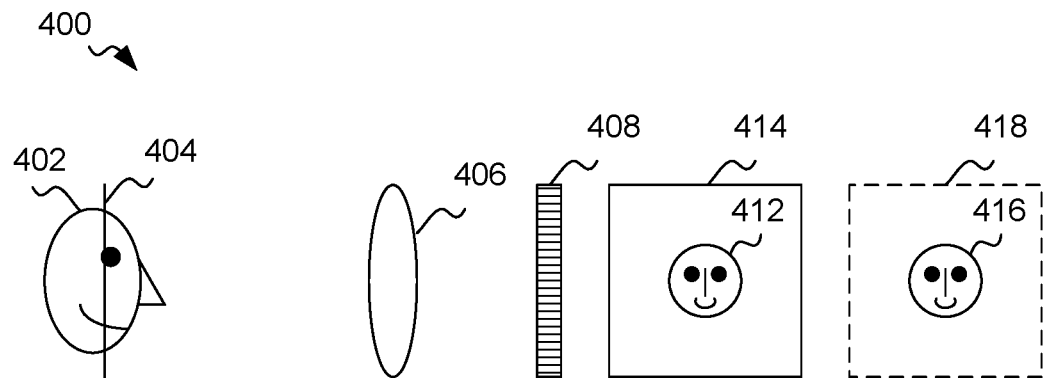

FIGS. 4A-4B illustrate a system 400 for 3D imaging using a PDAF image sensor, according to an embodiment of the invention. FIG. 4A shows that a lens 406 images a plane 404 of a 3D object 402 on a PDAF image sensor 408. Plane 404 is interchangeably referred to as cross-section 404 throughout this disclosure. PDAF image sensor 408 may be an image sensor having pixels 300 of FIG. 3. Lens 406 may be moved by an actuator 420 along a motion 410 to focus an image of plane 404 of 3D object 402 on PDAF image sensor 408. Initially, the position of a first image 412 of plane 404 of 3D object 402 in left image 414 is shifted from the position of a second image 416 of plane 404 of 3D object 402 in right image 418. FIG. 4B shows that after lens 406 is moved to an in-focus position, first image 412 in left image 414 overlaps with second image 416 in right image 418.

Figure 5:
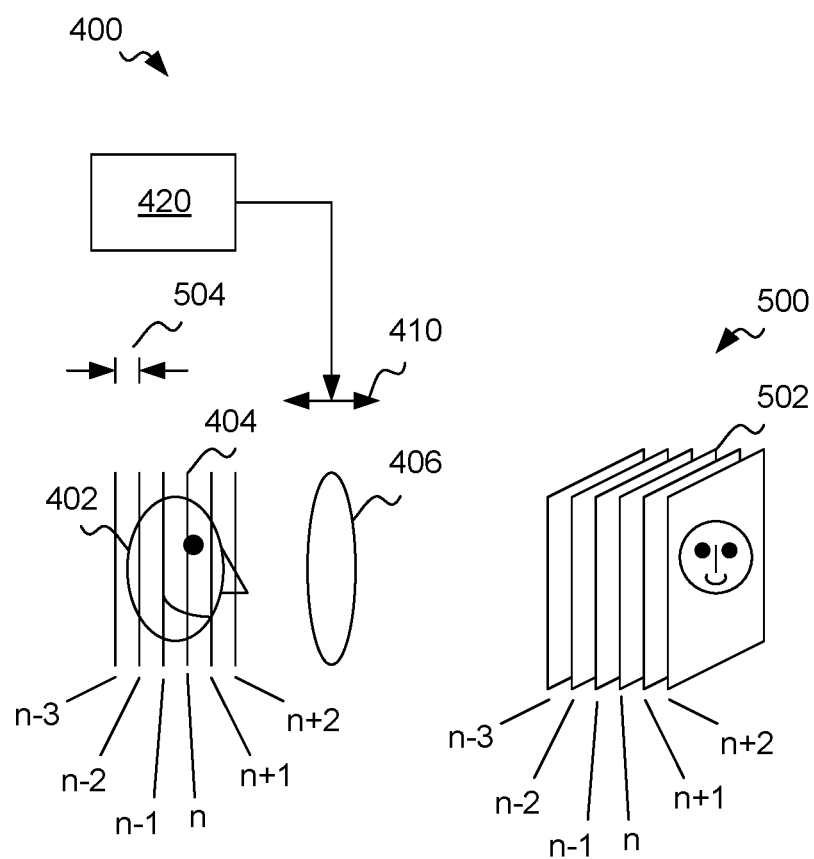
FIG. 5 illustrates subsequent planes of 3D object being imaged on PDAF image sensor, according to an embodiment of the invention.

FIG. 5 illustrates after plane 404 is imaged on PDAF image sensor 408, lens 406 is moved by actuator 420 to image another plane of 3D object 402 on image sensor 408, according to an embodiment of the invention. Plane 404 may be denoted by layer n. Lens 406 images layers, n, n+1, n+2, n−1, n−2, n−3, etc. consecutively on image sensor 408. Plane 502 is conjugate of plane 404 in the image domain. A stack 500 of layers conjugate of layers n, n+1, n+2, n−1, n−2, n−3, etc. of 3D object 402 may be formed in the image domain. For example, objects on layer p do not block objects on layer q as viewed by lens 406, for p>q.

Lens 406 is moved a step equivalent to an increment 504 in focusing layer m to focusing layer m+1, m may be any number of n, n+1, n+2, n−1, n−2, n−3, etc. Increment 504 is an optical-axis resolution of the formed 3D image. Increment 504, which is the distance between two subsequent layers, may be determined by the depth of focus or numerical aperture of lens 406. Stack of layers 500 forms a 3D image of 3D object 402. Smaller depth of focus or larger numerical aperture provides better resolution or smaller increment.

Figure 6:
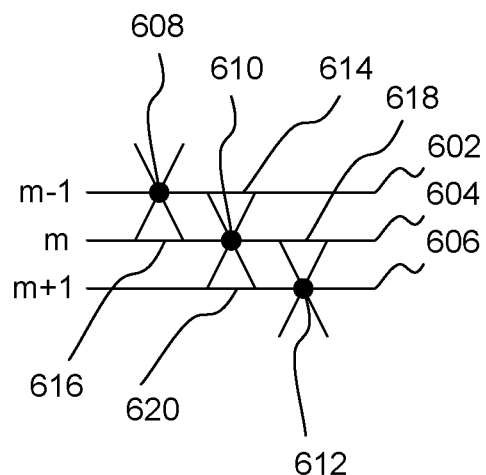
FIG. 6 illustrates images on layer m−1, m, and m+1, according to an embodiment of the invention.

FIG. 6 illustrates images on layer m−1, m, and m+1, m may be any number of n, n+1, n+2, n−1, n−2, n−3, etc., according to an embodiment of the invention. For example, a point image 608 is on layer m−1 (layer 602). A point image 610 is on layer m (layer 604). A point image 612 is on layer m+1 (layer 606). Unfocused light toward point image 610 may form a blurry spot 614 on layer 602. Unfocused light after forming point image 608 may form a blurry spot 616 on layer 604. Unfocused light toward point image 612 may form a blurry spot 618 on layer 604. Unfocused light after forming point image 610 may form a blurry spot 620 on layer 606.

Figure 7A:
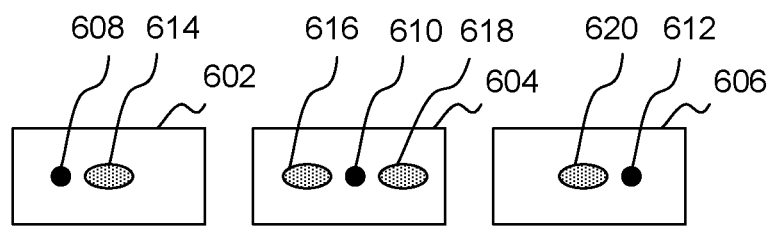
FIG. 7A illustrates images formed on layers including blurry spots, according to an embodiment of the invention.
Figure 7B:
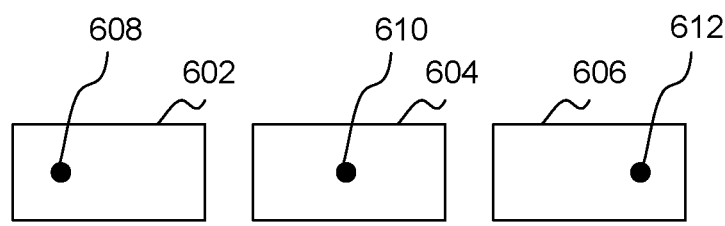
FIG. 7B illustrates images on layers after blurry spots being removed using the deblurring digital processing, according to an embodiment of the invention.

FIG. 7A illustrates images formed on layers 602, 604, and 606, respectively, according to an embodiment of the invention. Point image 608 and blurry spot 614 are formed on layer 602. Point image 610 and blurry spots 616 and 618 are formed on layer 604. Point image 612 and blurry spot 620 are formed on layer 606. The blurred image can be removed using a deblurring digital processing that may comprise an unsharp masking. For example, FIG. 7B illustrates images on layers 602, 604, and 606 after blurry spots are removed using the deblurring digital processing, according to an embodiment of the invention. After clean images on layers 602, 604, and 606 are obtained, stack of layers 500 of FIG. 5 may form a 3D image of 3D object 402.

Figure 8:
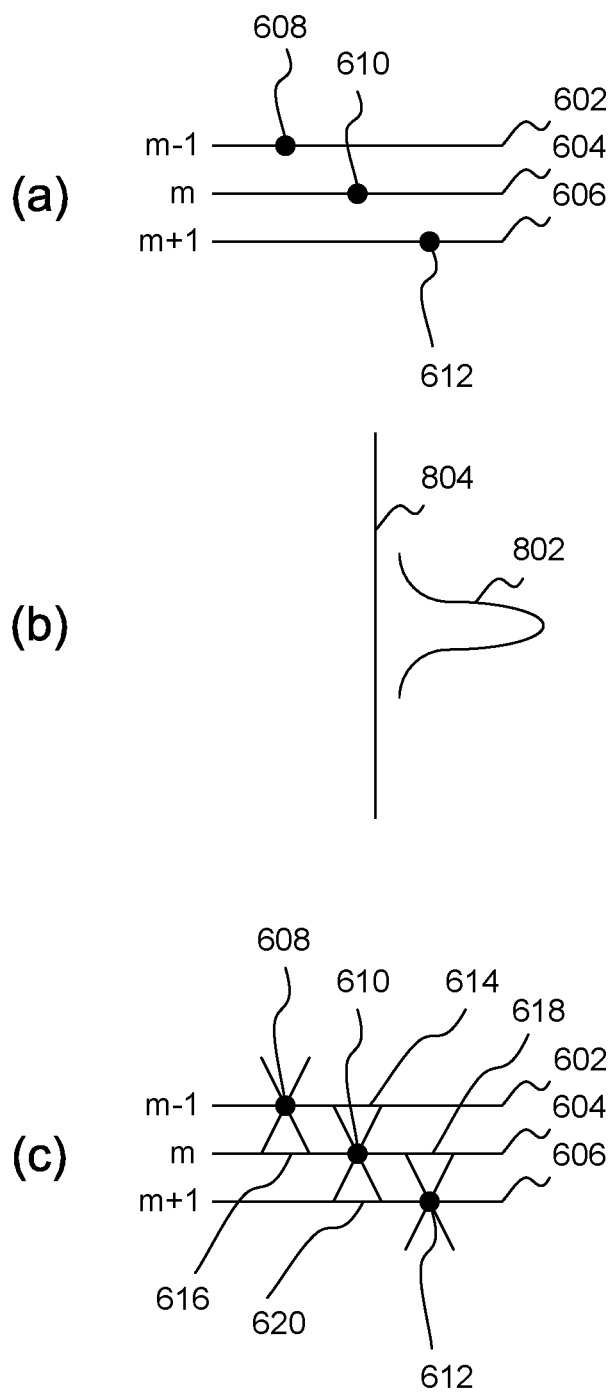
FIG. 8 illustrates images on layers being cleaned using the deconvolution digital processing, according to an embodiment of the invention.

FIG. 8 illustrates another method to get the clean images on layers 602, 604, and 606 of FIG. 7B, according to an embodiment of the invention. Part (a) shows that only point images are ideally on layers 602, 604, and 606. Part (b) shows a vertical (optical axis) point spread function 802 and an optical axis 804. Part (c) shows an actual images on layers 602, 604, and 606, produced by the imaging system, which are the ideal images as shown in part (a) having convolution with point spread function 802 of part (b). To obtain clean images on layers 602, 604, and 606 as shown in part (a), the convoluted images shown in part (c), which are the same as FIG. 7A, are deconvoluted with point spread function 802. In other words, part (a) is convoluted with part (b) producing part (c). Conversely, part (c) is deconvoluted with part (b) producing back part (a). After clean images on layers 602, 604, and 606, which are the same as FIG. 7B, are obtained using deconvolution digital processing, stack of layers 500 of FIG. 5 may form a 3D image of 3D object 402.

A 3D imaging system 400 is disclosed. The system comprises a PDAF image sensor 408, a lens 406 for imaging a cross-section 404 of a 3D object 402 on PDAF image sensor 408, and an actuator 420 for driving lens 406 for focusing each cross-section, layer n, n+1, n+2, n−1, n−2, n−3, etc., of 3D object 402 on PDAF image sensor 408. Actuator 402 drives lens 406 until PDAF image sensor 408 identifies an image of a first cross-section, e.g., cross-section 404, of 3D object 402 in-focus and records the image of the first cross-section. PDAF image sensor 408 records images of subsequent cross-sections, e.g., layers n, n+1, n+2, n−1, n−2, n−3, etc., of 3D object 402 formed by lens 406 driven by actuator 420 on PDAF image sensor 408. The recorded images of cross-sections of the 3D object are stacked to form a 3D image 500 of 3D object 402.

Prior to the recorded images of each cross-section of the 3D object being stacked to form a 3D image of the 3D object, the recorded images may be digitally processed by deblurring or deconvolution.

Subsequent cross-sections of the 3D object include cross-sections closer to the lens, e.g., layers n+1, n+2, etc., from the first cross-section, e.g., layer n, and cross-sections further away from the lens, e.g., n−1, n−2, n−3, etc., from the first cross-section, e.g., layer n.

PDAF image sensor 208 may comprise PDAF right-image pixels 202 for capturing a right image and left-image pixels 220 for capturing a left image. PDAF right-image pixel 202 is a pixel having a microlens, a photodiode, and a left mask blocking incident light of left image and allowing incident light of right image entering the photodiode, and PDAF left-image pixel 220 is a pixel having a microlens, a photodiode, and a right mask blocking incident light of right image and allowing incident light of left image entering the photodiode.

Figures 9, 11:
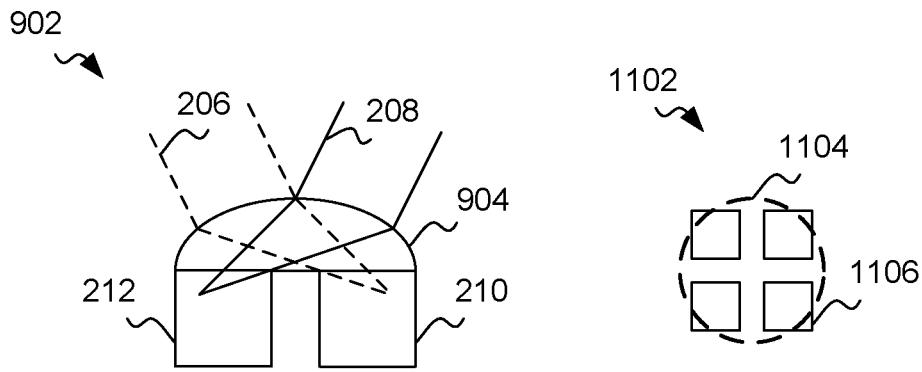
FIG. 9 illustrate a pair of PDAF pixels having a right-image pixel and a left-image pixel covered by a single microlens, according to an embodiment of the present invention.
FIG. 11 illustrate a group of PDAF pixels having four pixels covered by a single microlens, according to an embodiment of the present invention.

Alternatively, PDAF right-image pixel 202 and left-image pixel 220 of FIGS. 2A-2B may be replaced by a pair of pixels having a common microlens. In this manner, PDAF right-image pixel 202 and left-image pixel 220 are always side by side. FIG. 9 illustrate a pair of PDAF pixels 902 having a photodiode 212 of a left-image pixel and a photodiode 210 of a right-image pixel, and a single microlens 904 that covers both photodiodes 212 and 210, according to an embodiment of the present invention.

Microlens 904 focuses incident light to photodiodes 212 and 210. The incident light comprises right light 206 and left light 208. Right light 206 are from right light 110 of FIGS. 1A-1C. Left light 208 are from left light 108 of FIG. 1A-1C. Microlens 904 focuses right light 206 to photodiode 210 of right-image pixel, and focuses left light 208 to photodiode 212 of left-image pixel.

Figure 10:
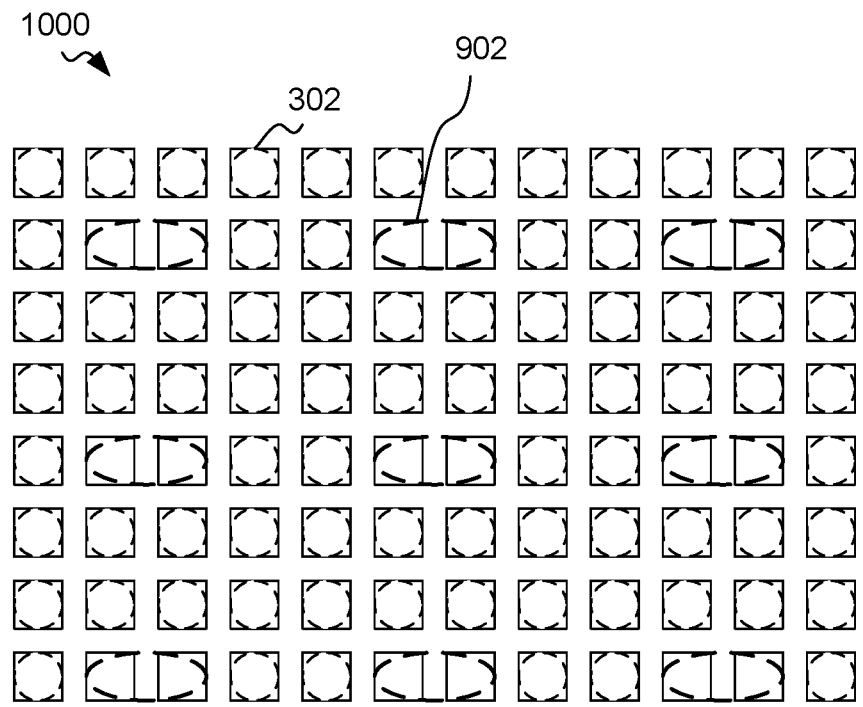
FIG. 10 illustrates pixels of a PDAF CMOS image sensor, according to an embodiment of the invention.

FIG. 10 illustrates pixels 1000 of a PDAF CMOS image sensor, according to an embodiment of the invention. Pixels 1000 comprise regular pixels 302 and a plurality of pairs of PDAF pixels 902 consisting of right-image pixels and left-image pixels. Regular pixel 302 has a microlens for each pixel. Pair of PDAF pixels 902 has a single microlens to cover right-image pixel and left-image pixel. The plurality of right-image pixels sample and form a right image such as right image 118 of FIGS. 1A-1C. The plurality of left-image pixels sample and form a left image such as left image 116 of FIGS. 1A-1C. The sampled and formed right and left images are used for the PDAF process.

FIG. 11 illustrates a group of PDAF pixels 1102 having four pixels 1106 covered by a single microlens 1104, according to an embodiment of the present invention. A PDAF right-image pixel and a PDAF left-image pixel are included in group of PDAF pixels 1102. It is appreciated that group of PDAF pixels 1102 may be used replacing pair of PDAF pixels 902. Based on the same principle, the PDAF process may include the matching of right and left images, and also the matching of upper and lower images.

Figure 12:
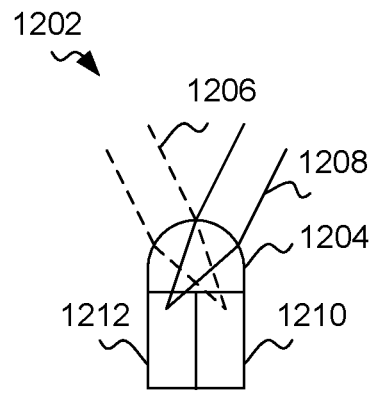
FIG. 12 illustrates a PDAF pixel having two isolated photodiodes, according to an embodiment of the invention.

FIG. 12 illustrates a PDAF pixel 1202 of a PDAF CMOS image sensor, according to an embodiment of the invention. Pixel 1202 has two isolated photodiodes 1210 and 1212. The incident light comprises right light 1206 and left light 1208. A microlens 1204 focuses incident right light 1206 to a right photodiode 1210 of pixel 1202. Right light 1206 are from right light 110 of FIGS. 1A-1C. Thus, a number of right photodiode 1210 will sample and form a right image such as right image 118 of FIGS. 1A-1C. The same microlens 1204 focuses incident left light 1208 to a left photodiode 1212 of pixel 1202. Left light 1208 are from left light 108 of FIGS. 1A-1C. Thus, a number of left photodiode 1212 will sample and form a left image such as left image 116 of FIGS. 1A-1C.

In contrast to PDAF pixels 202 and 220 in FIG. 3, in the detected image by the image sensor, the intensity value at the position of each PDAF pixel 1202 is the sum of the value detected by right photodiode 1210 and the value detected by left photodiode 1212. When the right image, e.g., right image 118 of FIGS. 1A-1C, is shifted from the left image, e.g., left image 116 of FIGS. 1A-1C, the value of right photodiode 1210 is different from the value of left photodiode 1212. When the right image overlaps with the left image, the value of right photodiode 1210 is the same as the value of left photodiode 1212.

Therefore an object on an in-focus plane, e.g., plane 404 of FIGS. 4A, 4B, and 5, may be identified by comparing the values of the right photodiode and the left photodiode of the same PDAF pixel at the image of the object. If they are the same, the pixel detects the image of the object on the in-focus plane.

Figure 13:
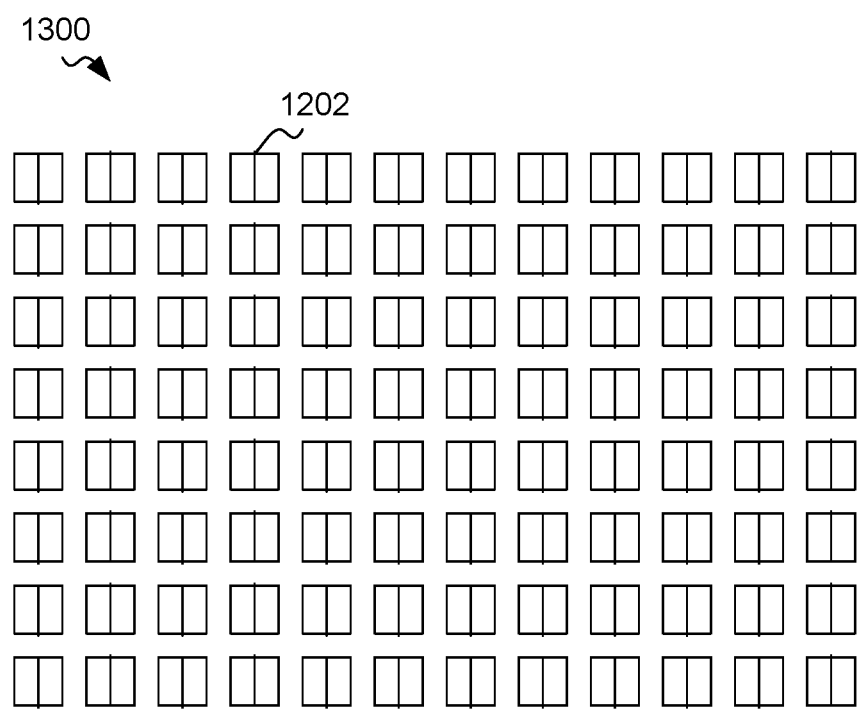
FIG. 13 illustrates a PDAF CMOS image sensor comprising all PDAF pixels of FIG. 12, according to an embodiment of the invention.

FIG. 13 illustrates pixels 1300 of a PDAF CMOS image sensor, according to an embodiment of the invention. Pixels 1300 may comprise all PDAF pixels 1202. At least two identical PDAF pixels 1202 are immediately next to each other. The intensity value at the position of each PDAF pixel 1202 is the sum of the value of right photodiode 1210 and the value of left photodiode 1212. No interpolation is required to read the value at each pixel 1202. The image is in-focus if the intensity value of the right photodiode is the same as the intensity value of the left photodiode.

Figure 14A:
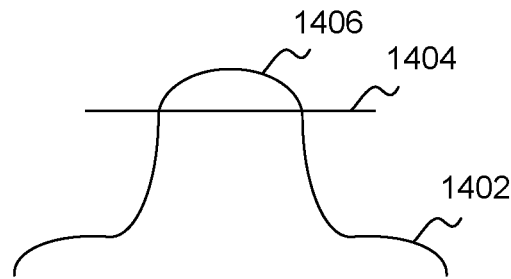
FIG. 14A illustrates a 3D object having mountain shape, according to an embodiment of the invention.
Figure 14B:
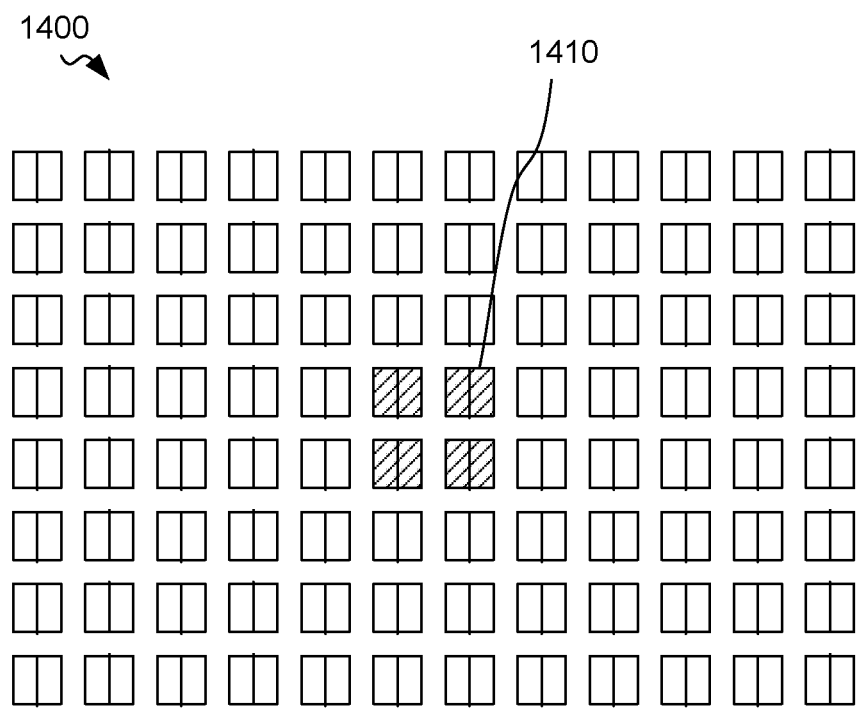
FIG. 14B illustrates shaded pixels indicating the image of the object on a plane of the 3D object, according to an embodiment of the invention.

FIG. 14A illustrates a 3D object 1402 having mountain shape, according to an embodiment of the invention. A plane 1404 may be plane 404 in FIGS. 4A-4B and FIG. 5, which is focused by lens 406 on image sensor 408 as shown in FIGS. 4A-4B. Plane 404 is interchangeably referred to as cross-section 404 throughout this disclosure. FIG. 14B illustrates pixels 1400 of an image sensor, which may be image sensor 408 of FIGS. 4A-4B. Shaded pixels 1410 indicate the image of objects on plane 1404. Plane 1404 includes a mountain top 1406. The image of mountain top 1406 of plane 1404 is formed on pixels 1410. The right photodiode and left photodiode of a pixel 1410 have the same value, because they detect an in-focus image, while other pixels will not have the same value between right photodiode and left photodiode, because they detect out-of-focus image. Therefore pixels 1410 may be identified from other pixels in pixels 1400. Other pixels in pixels 1400 may be ignored and not recorded. Only pixels 1410 are recorded.

Figure 15A:
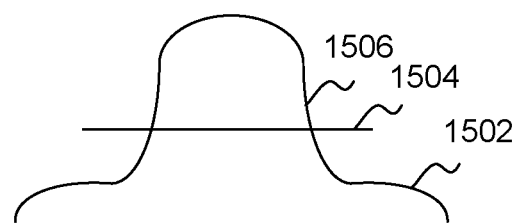
FIG. 15A illustrates a 3D object having mountain shape, according to an embodiment of the invention.
Figure 15B:
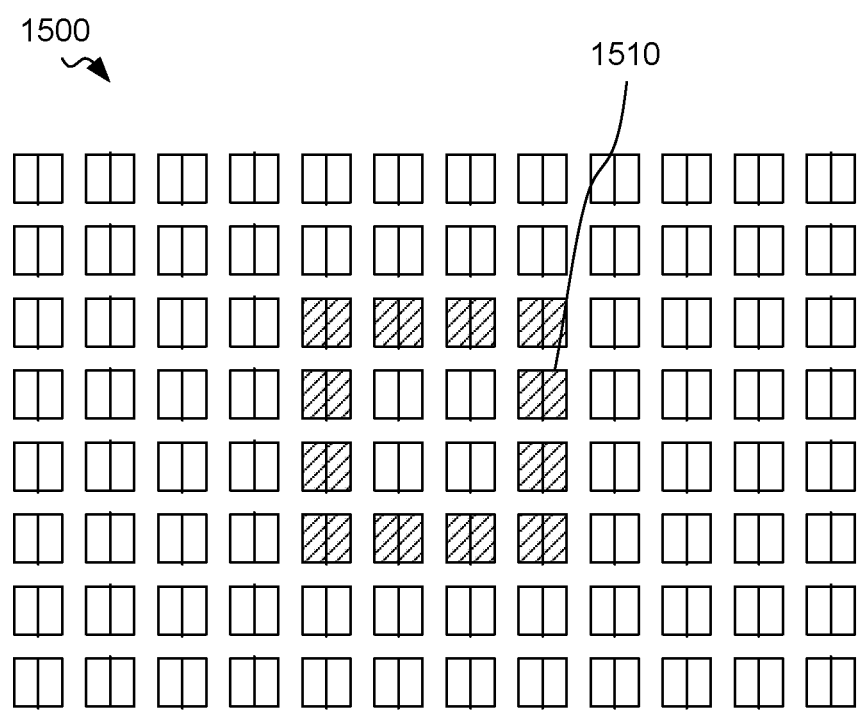
FIG. 15B illustrates shaded pixels indicating the image of the object on a plane of the 3D object, according to an embodiment of the invention.

FIG. 15A illustrates same 3D object 1502 having mountain shape, according to an embodiment of the invention. A plane 1504 may be plane 404 in FIGS. 4A-4B and FIG. 5, which is focused by lens 406 on image sensor 408 as shown in FIGS. 4A-4B. FIG. 15B illustrates pixels 1500 of an image sensor, which may be image sensor 408 of FIGS. 4A-4B. Shaded pixels 1510 indicate the image of objects on plane 1504. Plane 1504 includes side walls 1506. The image of side walls 1506 of plane 1504 is formed on pixels 1510. The right photodiode and left photodiode of a pixel 1510 have the same value, because they detect an in-focus image, while other pixels will not have the same value between right photodiode and left photodiode, because they detect out-of-focus image. Therefore pixels 1510 may be identified from other pixels in pixels 1500. Other pixels in pixels 1500 may be ignored and not recorded. Only pixels 1510 are recorded.

Figure 16A:
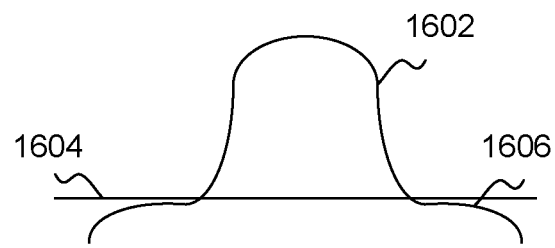
FIG. 16A illustrates a 3D object having mountain shape, according to an embodiment of the invention.
Figure 16B:
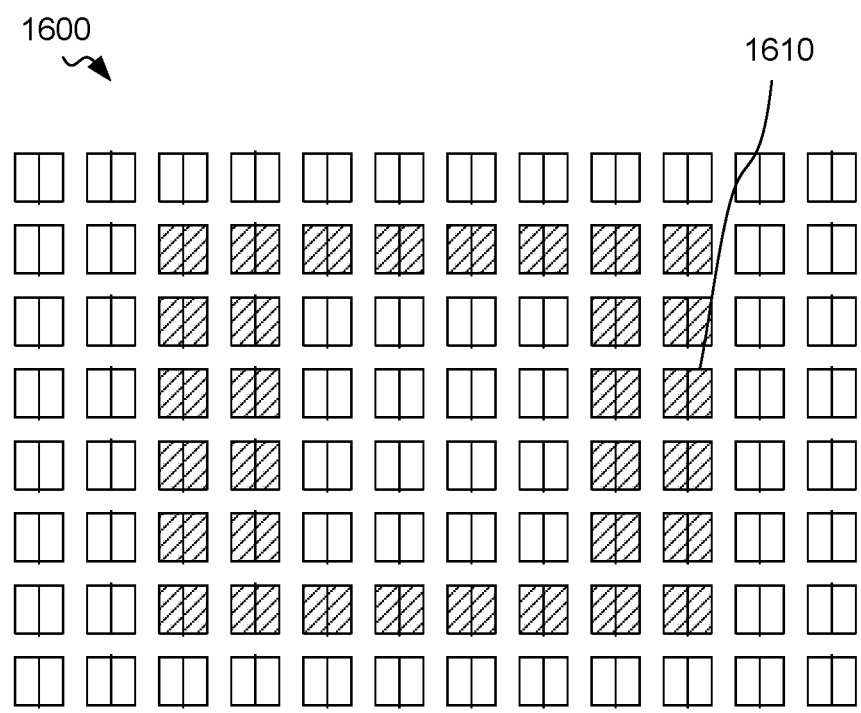
FIG. 16B illustrates shaded pixels indicating the image of the object on a plane of the 3D object, according to an embodiment of the invention.

FIG. 16A illustrates same 3D object 1602 having mountain shape, according to an embodiment of the invention. A plane 1604 may be plane 404 in FIGS. 4A-4B and FIG. 5, which is focused by lens 406 on image sensor 408 as shown in FIGS. 4A-4B. FIG. 13B illustrates pixels 1600 of an image sensor, which may be image sensor 408 of FIGS. 4A-4B. Shaded pixels 1610 indicate the image of objects on plane 1604. Plane 1604 includes a surrounding land 1606. The image of surrounding land 1606 of plane 1604 is formed on pixels 1610. The right photodiode and left photodiode of a pixel 1610 have the same value, because they detect an in-focus image, while other pixels will not have the same value between right photodiode and left photodiode, because they detect out-of-focus image. Therefore pixels 1610 may be identified from other pixels in pixels 1600. Other pixels in pixels 1600 may be ignored and not recorded. Only pixels 1610 are recorded.

Pixels 1410 provide image of objects on plane 1404 only without images of objects on other planes. Pixels 1510 provide image of objects on plane 1504 only without images of objects on other planes. Pixels 1610 provide image of objects on plane 1604 only without images of objects on other planes. Accordingly, stacking images provided by pixels 1410, 1510, 1610, and so on, may form a 3D image, such as stack of layer 500 of FIG. 5. In this manner, a 3D image may be formed without performing deblurring or deconvultion digital processing.

A 3D imaging system 400 is further disclosed. The system comprises a PDAF image sensor 408, a lens 406 for imaging a cross-section 404 of a 3D object 402 on PDAF image sensor 408, and an actuator 420 for driving lens 406 for focusing each cross-section, layer n, n+1, n+2, n−1, n−2, n−3, etc., of 3D object 402 on PDAF image sensor 408. PDAF image sensor 408 comprises PDAF pixels 1300, each PDAF pixel 1202 has a microlens 1204, and separated right photodiode 1210 and left photodiode 1212, right photodiodes 1210 for capturing a right image and left photodiodes 1212 for capturing a left image, wherein the right image is the image formed by light through a right half of the lens, and the left image is the image formed by light through a left half of the lens. PDAF image sensor 408 records values of PDAF pixels 1202 of an image of each cross-section, if the right photodiode 1210 and the left photodiode 1212 of PDAF pixel 1202 have a same value, forming a recorded image 502 of each cross-section; wherein recorded images 502 of subsequent cross-sections, e.g., layer n, n+1, n+2, n−1, n−2, n−3, etc., of 3D object 402 are stacked to form a 3D image 500 of 3D object 402.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A 3D imaging system comprising:
   a phase detection autofocus (PDAF) image sensor;
   a lens for imaging a cross-section of a 3D object on the phase detection autofocus (PDAF) image sensor;
   an actuator for driving the lens for imaging each cross-section of the 3D object on the PDAF image sensor;
   wherein the actuator drives the lens until the PDAF image sensor identifies an image of a first cross-section of the 3D object in-focus and records the image of the first cross-section;
   wherein the PDAF image sensor records images of subsequent cross-sections of the 3D object formed by the lens driven by the actuator on the PDAF image sensor;
   wherein the recorded images of cross-sections of the 3D object are stacked to form a 3D image of the 3D object;
   wherein prior to the recorded images of cross-sections of the 3D object being stacked to form the 3D image of the 3D object, the recorded images are digitally processed by one of deblurring using unsharp masking and deconvolution of the recorded images with a vertical point spread function.

2. The system of claim 1, wherein the subsequent cross-sections of the 3D object comprising one of cross-sections closer to the lens from the first cross-section and cross-sections further away from the lens from the first cross-section.

3. The system of claim 1, wherein the PDAF image sensor comprises PDAF right-image pixels for capturing a right image and left-image pixels for capturing a left image, wherein the right image is the image formed by light through a right half of the lens, and the left image is the image formed by light through a left half of the lens.

4. The system of claim 3, wherein the PDAF right-image pixel is a pixel having a microlens, a photodiode, and a left mask blocking incident light of the left image and allowing incident light of the right image entering the photodiode, and the PDAF left-image pixel is a pixel having a microlens, a photodiode, and a right mask blocking incident light of the right image and allowing incident light of the left image entering the photodiode.

5. The system of claim 4, wherein the PDAF identifies the image of the first cross-section of the 3D object in-focus based on overlapping of the right image and the left image.

6. The system of claim 1, wherein the PDAF image sensor comprises PDAF pixels, each PDAF pixel has a micro lens, and separated right and left photodiodes, the right photodiodes for capturing a right image and the left photodiodes for capturing a left image,
wherein the right image is the image formed by light through a right half of the lens, and the left image is the image formed by light through a left half of the lens.

7. The system of claim 6, wherein the PDAF image sensor identifies the image of the first cross-section of the 3D object in-focus if the right photo diode and the left photodiode of the PDAF pixel have a same value.

8. The system of claim 6, wherein at least two identical PDAF pixels are immediately next to each other.

9. A 3D imaging system comprising:
a phase detection autofocus (PDAF) image sensor;
wherein the PDAF image sensor comprises PDAF right-image pixels for capturing a right image and left-image pixels for capturing a loft image, wherein the right image is the image formed by light through a right half of the lens, and the left image is the image formed by light through a left half of the lens:
a lens for imaging a cross-section of a 3D object on the PDAF image sensor;
an actuator for driving the lens for imaging each cross-section of the 3D object on the PDAF image sensor;
wherein the actuator drives the lens until the PDAF image sensor identifies an image of a first cross-section of the 3D object in-focus and records the image of the first cross-section;
wherein the PDAF identifies the image of the first cross-section of the 3D object in-focus based on overlapping of the right image and the left image;
wherein the PDAF image sensor records images of subsequent cross-sections of the 3D object formed by the lens driven by the actuator on, the PDAF image sensor;
wherein the recorded images of cross-sections of the 3D object are stacked to form a 3D image of the 3D object; and
wherein a distance between two subsequent cross-sections is determined by one of a cloth of focus and a numerical aperture of the lens.

10. The system of claim 9, wherein the PDAF right-image pixel is a pixel having a microlens, a photodiode, and a left mask blocking incident light of the left image and allowing incident light of the right image entering the photodiode, and the PDAF left-image pixel is a pixel having a microlens, a photodiode, and a right mask blocking incident light of the right image and allowing incident light of the left image entering the photodiode.

11. The system of claim 9, wherein the subsequent cross-sections of the 3D object comprising one of cross-sections closer to the lens from the first cross-section and cross-sections further away from the lens from the first cross-section.

12. The system of claim 9, wherein the PDAF right-image pixel and left-image pixel are included in a pair of pixels, which is covered by a single microlens.

13. The system of claim 9, wherein the PDAF right-image pixel and left-image pixel are included in a group of four pixels, which is covered by a single microlens.

14. The system of claim 9, wherein prior to the recorded images of cross-sections of the 3D object being stacked to form the 3D image of the 3D object, the recorded images are digitally processed by one of deblurring using unsharp masking and deconvolution of the recorded images with a vertical point read function.

15. A 3D imaging system comprising:
a phase detection autofocus (PDAF) image sensor, wherein the PDAF image sensor comprises PDAF pixels, each PDAF pixel has a microlens, and separated right and left photodiodes, right photodiodes for capturing a right image and left photodiodes for capturing a left image, wherein the right image is the image formed by light through a right half of the lens, and the left image is the image formed by light through a left half of the lens;
a lens for imaging a cross-section of a 3D object on the PDAF image sensor;
an actuator for driving the lens for imaging subsequent cross-sections of the 3D object on the PDAF image sensor;
wherein the PDAF image sensor records values of PDAF pixels of an image of each cross-section, if the right photo diode and the left photodiode of the PDAF pixel have a same value, forming a recorded image of each cross-section;
wherein the recorded images of the subsequent cross-sections of the 3D object are stacked to form a 3D image of the 3D object.

16. The system of claim 15, wherein the PDAF image sensor does not, record a value of a PDAF pixel of an image of a cross-section, if a right photo diode and a left photo diode of the PDAF pixel have different values.

17. The system of claim 15, wherein at least two identical PDAF pixels are immediately next to each other.

18. The system of claim 15, wherein a distance between two subsequent cross-sections is determined by one of a depth of focus and a numerical aperture of the lens.

* * * * *